United States Patent
Messick et al.

(10) Patent No.: US 10,877,551 B2
(45) Date of Patent: Dec. 29, 2020

(54) SYSTEM AND METHOD OF MANAGING INFORMATION HANDLING SYSTEMS

(71) Applicant: Dell Products L.P., Round Rock, TX (US)

(72) Inventors: Douglas Evan Messick, Austin, TX (US); Aaron Michael Rhinehart, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 239 days.

(21) Appl. No.: 15/950,763

(22) Filed: Apr. 11, 2018

(65) Prior Publication Data
US 2019/0317588 A1 Oct. 17, 2019

(51) Int. Cl.
*G06F 1/32* (2019.01)
*G06F 1/3234* (2019.01)
*G06F 1/3293* (2019.01)
*G06F 1/3206* (2019.01)
*G06F 11/30* (2006.01)
*G06F 1/18* (2006.01)

(52) U.S. Cl.
CPC .............. *G06F 1/3275* (2013.01); *G06F 1/18* (2013.01); *G06F 1/3206* (2013.01); *G06F 1/3293* (2013.01); *G06F 11/3062* (2013.01)

(58) Field of Classification Search
CPC ................. G06F 1/32; G06F 9/44; G06F 1/28
See application file for complete search history.

(56) References Cited

U.S. PATENT DOCUMENTS

| | | | |
|---|---|---|---|
| 2003/0065958 A1* | 4/2003 | Hansen | G06F 1/26 713/300 |
| 2010/0211804 A1* | 8/2010 | Brumley | G06F 1/206 713/300 |
| 2011/0016340 A1* | 1/2011 | Sun | G06F 1/30 713/340 |
| 2012/0317382 A1* | 12/2012 | Steed | G06F 11/1441 711/162 |
| 2013/0179718 A1* | 7/2013 | Jau | G06F 1/263 713/340 |
| 2015/0253827 A1* | 9/2015 | Yanagidaira | G06F 1/3287 713/300 |
| 2017/0010652 A1* | 1/2017 | Huang | G06F 11/0751 |
| 2017/0277593 A1* | 9/2017 | Yoon | G06F 11/1441 |
| 2019/0094942 A1* | 3/2019 | Matsumura | G06F 1/3212 |

* cited by examiner

*Primary Examiner* — Keshab R Pandey
(74) *Attorney, Agent, or Firm* — Baker Botts L.L.P.

(57) ABSTRACT

In one or more embodiments, one or more systems, methods, and/or processes may determine that a number of operational power supply units is below a first threshold; may determine a first amount of power consumed by multiple information handling systems (IHSs); may determine that the first amount of power meets a second threshold; may initiate a first transfer of data from at least one volatile memory medium of a first information handling system (IHS) of the multiple IHSs to at least one non-volatile memory medium of the first IHS; may determine a second amount of power consumed by the multiple IHSs; and may determine that the second amount of power meets a third threshold; and may initiate a second transfer of data from at least one volatile memory medium of a second IHS of the multiple IHSs to at least one non-volatile memory medium of the IHS.

20 Claims, 8 Drawing Sheets

SYSTEM AND METHOD OF MANAGING INFORMATION HANDLING SYSTEMS

BACKGROUND

Field of the Disclosure

This disclosure relates generally to information handling systems and more particularly to managing power of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine that a number of operational power supply units of multiple power supply units is below a first threshold; may determine a first amount of power consumed by multiple information handling systems housed by an information handling system chassis; may determine if the first amount of power meets a second threshold; if the first amount of power meets the second threshold: may initiate a first transfer of data from at least one volatile memory medium of a first information handling system of the multiple information handling systems to at least one non-volatile memory medium of the first information handling system; after the first information handling system is powered down, may determine a second amount of power consumed by the multiple information handling systems; may determine that the second amount of power meets a third threshold; and may initiate a second transfer of data from at least one volatile memory medium of a second information handling system of the multiple information handling systems to at least one non-volatile memory medium of the second information handling system; if the amount of power does not meet the second threshold, may determine if one or more chassis criteria meet one or more respective thresholds; if the one or more chassis criteria meet the one or more respective thresholds, may power off the information handling system chassis; and if the one or more chassis criteria does not meet the one or more respective thresholds, may initiate a throttle of one or more of the multiple information handling systems. In one example, a first non-volatile dual in-line memory module of the first information handling system may include the at least one volatile memory medium of the first information handling system and the at least one non-volatile memory medium of the first information handling system. In another example, a second non-volatile dual in-line memory module of the second information handling system may include the at least one volatile memory medium of the second information handling system and the at least one non-volatile memory medium of the second information handling system. In one or more embodiments, the first information handling system may include a battery power supply that provides power to the first non-volatile dual in-line memory module of the first information handling system.

In one or more embodiments, the one or more systems, methods, and/or processes may further power down the first information handling system and/or power down the second information handling system. In one or more embodiments, the one or more systems, methods, and/or processes may further receive configuration information. For example, the configuration information may include one or more thresholds. In one instance, the configuration information may include one or more of the first threshold and the second threshold, among others. In another instance, the configuration information may include one or more thresholds associated with respective one or more chassis criteria. In one or more embodiments, the one or more systems, methods, and/or processes may further monitor power consumed by the multiple information handling systems. For example, monitoring the power consumed by the multiple information handling systems may include determining the second amount of power consumed by the multiple information handling systems of the information handling system chassis and/or determining that the second amount of power meets the third threshold, among others. In one or more embodiments, determining the first amount of power consumed by the multiple information handling systems of the information handling system chassis may include determining power consumed by at least one other component of the chassis.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
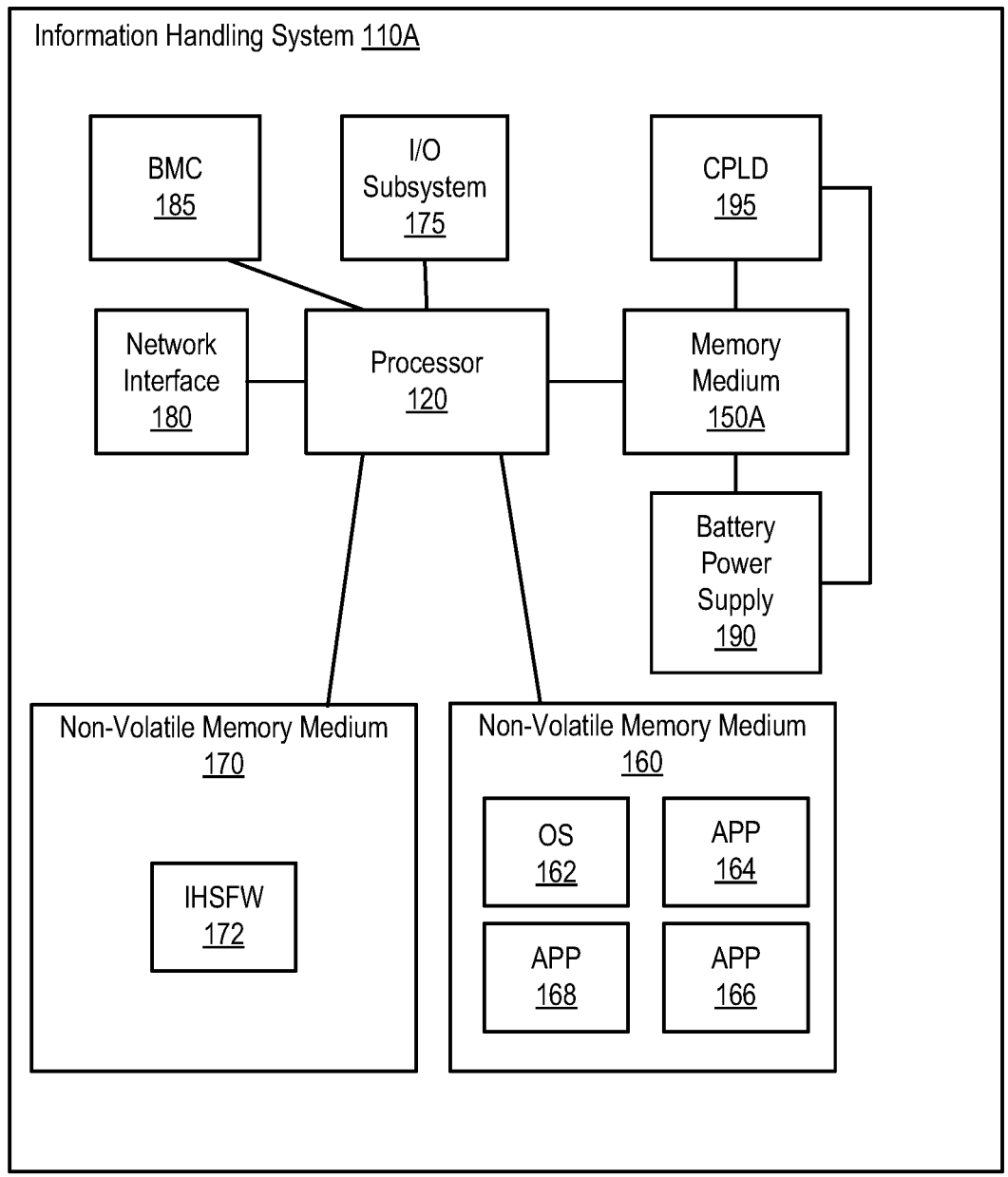
FIGS. 1A and 1B illustrate examples of information handling systems, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a number of operational power supply units may be below a minimum number of power supply units configured for an information handling system chassis, while power consumption of the information handling system chassis may not pose a risk of the power supplies not being able to produce enough power. For example, a chassis manager (e.g., an enclosure controller) may evaluate the power consumption of the chassis versus available power from remaining operational power supplies. If the power consumption exceeds a configured power supply utilization threshold (e.g., a default value, a user settable value, etc.), then the chassis may be deemed to be at risk of a shutdown and/or a potential loss of data on information handling systems of the chassis. If the chassis is be deemed to be at risk of a shutdown and/or a potential loss of data, the chassis manager may initiate a persistent memory save process. After the persistent memory save process completes, the chassis may be shutdown. If the power consumption does not exceed the configured power supply utilization threshold, then the chassis may continue to operate without initiating the persistent memory save process.

In one or more embodiments, an information handling system chassis may be configured with multiple information handling systems. For example, the multiple information handling systems may include first information handling systems that include persistent memory media and may include second information handling systems that do not include persistent memory media. For instance, a persistent memory medium may include a non-volatile dual in-line memory module.

In one or more embodiments, a power allocation for an information handling system chassis may include a minimum number of power supply units to be fully operational. For example, if a number of operational power supplies of the information handling system chassis drops below the minimum number of power supply units, power utilization of the information handling system chassis may be evaluated. For instance, if an evaluation of the power utilization determines that the remaining operational power supply units can provide sufficient power to the information handling systems of the information handling system chassis, the information handling system chassis may continue operations until a power utilization increases. In one or more embodiments, power utilization may increase to exceed a percentage of power that may be supplied by the remaining operational power supply units. In one or more embodiments, one or more criteria may bypass a power consumption evaluation and initiate a persistent memory save process.

In one or more embodiments, an information handling system chassis may be in a low power consumption state. For example, when the information handling system chassis is in the low power consumption state, one or more information handling systems of the information handling system chassis may continue to operate. For instance, one or more power supplies of the information handling system chassis may provide sufficient power to the one or more information handling systems of the information handling system chassis, which may permit, allow, and/or enable the one or more information handling systems to continue to operate. In one or more embodiments, an enclosure controller of the information handling system chassis may determine if the one or more information handling systems may continue to operate. For example, the enclosure controller may receive various information from various components of the information handling system chassis. For instance, determining if the one or more information handling systems may continue to operate may include utilizing the various information from various components of the information handling system chassis.

In one or more embodiments, an information handling system of the information handling system chassis may include one or more non-volatile dual in-line memory modules, or other persistent memory technology, which may permit, allow, and/or enable data to persist when power is removed from the information handling system. In one or more embodiments, a persistent memory save process may prioritize power delivery to first one or more information handling systems of the information handling system chassis by powering down second one or more information handling systems of the information handling system chassis. For example, the first one or more information handling systems may include one or more persistent memory modules such as one or more non-volatile dual in-line memory modules, while the second information handling systems may not include one or more persistent memory modules. In one or more embodiments, powering down the second one or more information handling systems may permit, allow, and/or enable a save process to store data of one or more volatile data storages of a persistent memory module to one or more non-volatile data storages of the persistent memory module. For example, powering down the second one or more information handling systems may cause and/or result in data loss of the second one or more information handling systems.

In one or more embodiments, the enclosure controller may determine a minimum number of power supply units for operation of the first one or more information handling systems and the second one or more information handling systems. In one example, the information handling system chassis may operate normally when a number of operational power supply units is above the minimum number of power supply units for operation of the first one or more information handling systems and the second one or more information handling systems. In another example, if a power excursion (e.g., a power consumption spike) and/or if a number of operational power supply units is no longer above the minimum number of power supply units for operation of the first one or more information handling systems and the second one or more information handling systems, the enclosure controller may initiate a persistent memory save of the first one or more information handling systems and/or may power down the second one or more information handling systems. For instance, powering down the second one or more information handling systems may cause and/or result in data loss of the second one or more information handling systems.

In one or more embodiments, if a power excursion (e.g., a power consumption spike) and/or if a number of operational power supply units is no longer above the minimum number of power supply units for operation of the first one or more information handling systems and the second one or more information handling systems, the enclosure controller may initiate a persistent memory save of the first one or more information handling systems and power down the first one or more information handling systems. For example, power may be continued to be supplied to the second one or more information handling systems. For instance, continuing to provide power to the second one or more information handling systems may mitigate and/or abate data loss of the second one or more information handling systems. In one or more embodiments, even if the number of operational power supply units is no longer above the minimum number of power supply units for operation of the first one or more information handling systems and the second one or more information handling systems, the operational power supplies may provide sufficient power to the second one or more information handling systems.

Figure 1B:
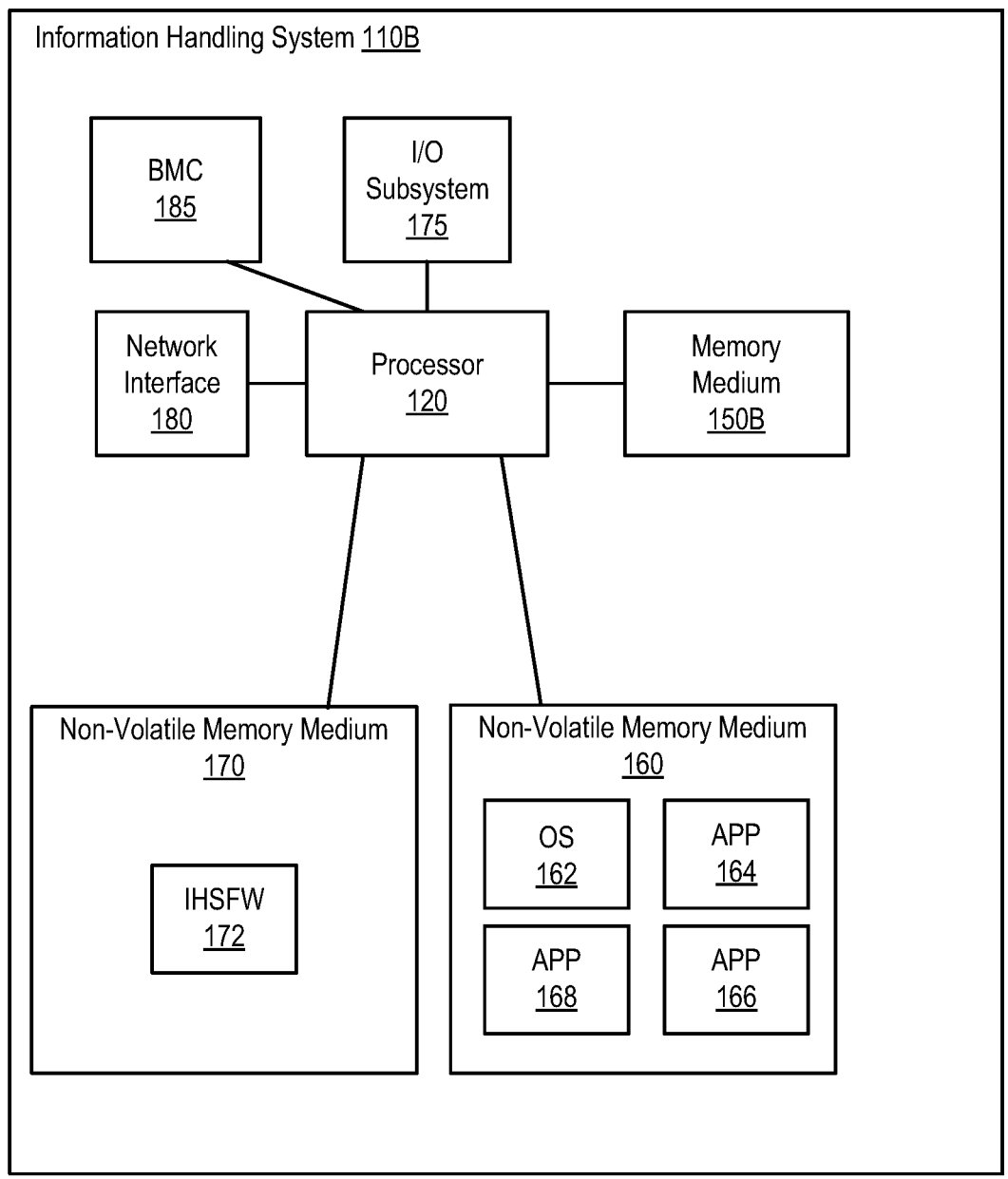

Turning now to FIGS. 1A and 1B, examples of information handling systems are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a memory medium 150, non-volatile memory media 160 and 170, an I/O subsystem 175, a network interface 180, a boot management controller (BMC) 185, and a battery power supply 190. As illustrated, memory medium 150, non-volatile memory media 160 and 170, I/O subsystem 175, network interface 180, and BMC 185 may be communicatively coupled to processor 120.

In one or more embodiments, memory medium 150A may include one or more of a volatile memory medium and a non-volatile memory medium. In one example, memory medium 150 may include DRAM (dynamic RAM). In another example, memory medium 150 may include DRAM and one or more non-volatile memory media. In one instance, the one or more non-volatile memory media may include flash memory. In another instance, the one or more non-volatile memory media may include 3D XPoint memory (available from Intel, Inc.). In one or more embodiments, one or more volatile memory media of memory medium 150 and one or more non-volatile memory media of memory medium 150 may be included via a single memory device. For example, memory medium 150A may be or include one or more non-volatile dual in-line memory modules (NVDIMMs). For instance, one or more volatile memory media of memory medium 150 and one or more non-volatile memory media of memory medium 150 may be included via a single non-volatile dual in-line memory module (NVDIMM). In one or more embodiments, memory medium 150B may include one or more of volatile memory media. For example, memory medium 150B may not include a non-volatile memory medium.

As illustrated, IHS 110A may include a battery power supply 190 coupled to memory medium 150A. As shown, IHS 110A may include a complex programmable logic device (CPLD) 195 coupled to memory medium 150A and battery power supply 190. In one or more embodiments, CPLD 195 may be or include a programmable logic device. For example, CPLD 195 may include one or more structures and/or functionalities of a field programmable gate array (FPGA) and/or one or more structures and/or functionalities of a programmable array logic (PAL), among others. For instance, CPLD 195 may include logic that may implement disjunctive normal form expressions and/or specialized logic operations. In one or more embodiments, CPLD 195 may provide information to memory medium 150A to transfer data from a volatile memory medium of memory medium 150 to a non-volatile memory medium of memory medium 150A. In one or more embodiments, CPLD 195 may provide allow, permit, and/or enable battery power supply 190 to provide power to memory medium 150. For example, CPLD 195 may provide allow, permit, and/or enable battery power supply 190 to provide power to memory medium 150 when CPLD 195 provides information to memory medium 150A to transfer data from a volatile memory medium of memory medium 150 to a non-volatile memory medium of memory medium 150A.

In one or more embodiments, one or more of memory medium 150, non-volatile memory media 160 and 170, I/O subsystem 175, and network interface 180 may be communicatively coupled to processor 120 via one or more buses, one or more switches, and/or one or more root complexes, among others. In one example, one or more of memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Memory medium 150 may include volatile storage such as, for example, RAM, DRAM, EDO RAM (extended data out RAM), SRAM (static RAM), etc. One or more of non-volatile memory media 160 and 170 may include non-volatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to memory medium 150, and processor 120 may execute the one or more portions of the processor instructions of the one or more of OS 162 and APPs 164-168 via memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to memory medium 150, and processor 120 may execute the one or more portions of the processor instructions of IHSFW 172 via memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel universal serial bus (USB) interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include one or more of a FPGA and an ASIC, among others, configured, coded, and/or encoded with instructions in accordance with one or more of systems, flowcharts, methods, and/or processes described herein.

Figure 2:
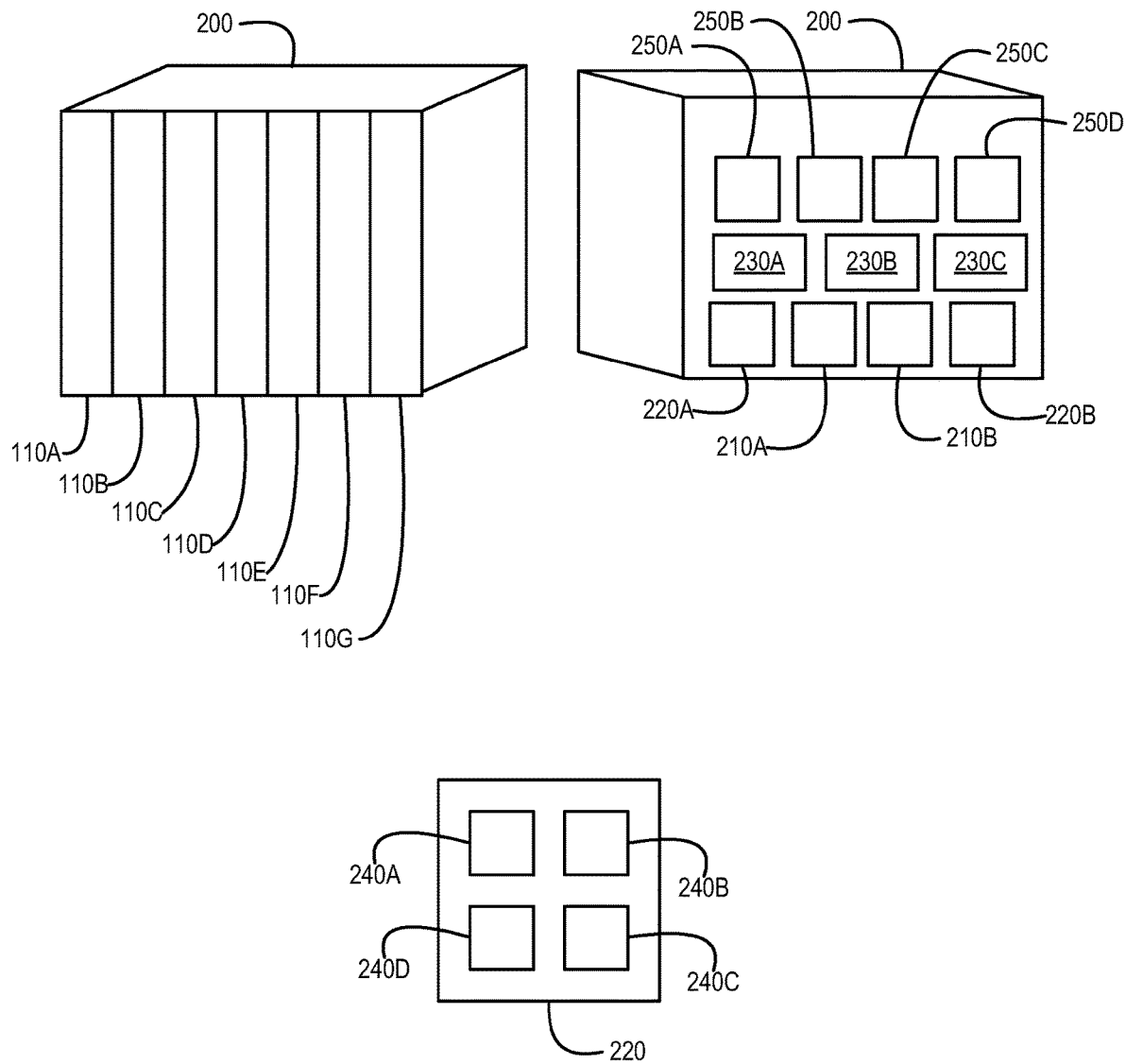
FIG. 2 illustrates an example of an information handling system chassis, according to one or more embodiments.

Turning now to FIG. 2, an example of an information handling system chassis is illustrated, according to one or more embodiments. As shown, an information handling system chassis 200 may include and/or may be configured to include multiple information handling systems (IHSs). For example, chassis 200 may and/or may be configured to include IHSs 110A-110G. In one instance, each of one or more of IHSs 110C-110E may include one or more structures and/or one or more functionalities as those described with reference to IHS 110A. In another instance, each of one or more of IHSs 110F and 110G may include one or more structures and/or one or more functionalities as those described with reference to IHS 110B. In one or more embodiments, chassis 200 may be configured to house one or more of IHSs 110A-110G. For example, one or more of IHSs 110A-110G may be removable. For instance, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one or more embodiments, chassis 200 may include one or more power supply nodes (PSNs). As shown, chassis 200 may include PSNs 220A and 220B. In one or more embodiments, a power supply node (PSN) 220 may include one or more power supply units (PSUs) 240. For example, a PSN 220 may include multiple power PSUs 240A-240D. For instance, if one of the multiple PSUs is associated with an issue, PSN 220 may continue to provide power to chassis 200 via one or more other PSUs. In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated, chassis 200 may include fans 230A-230C. In one or more embodiments, an enclosure controller (EC) 210 may monitor one or more fans 230, one or more temperatures of one or more portions of chassis 200, one or more PSUs 240, and/or one or more PSNs 220, among others. In one or more embodiments, EC 210 may control one or more portions and/or one or more components of chassis 200. In one or more embodiments, EC 210 may include one or more structures and/or one or more functionalities as those described with reference to IHS 110. In one or more embodiments, EC 210 may be configured, coded, and/or encoded with instructions in accordance with one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one or more embodiments, one or more of non-volatile memory media 250A-250D may provide storage for one or more of IHSs 110A-110G.

Figure 3A:
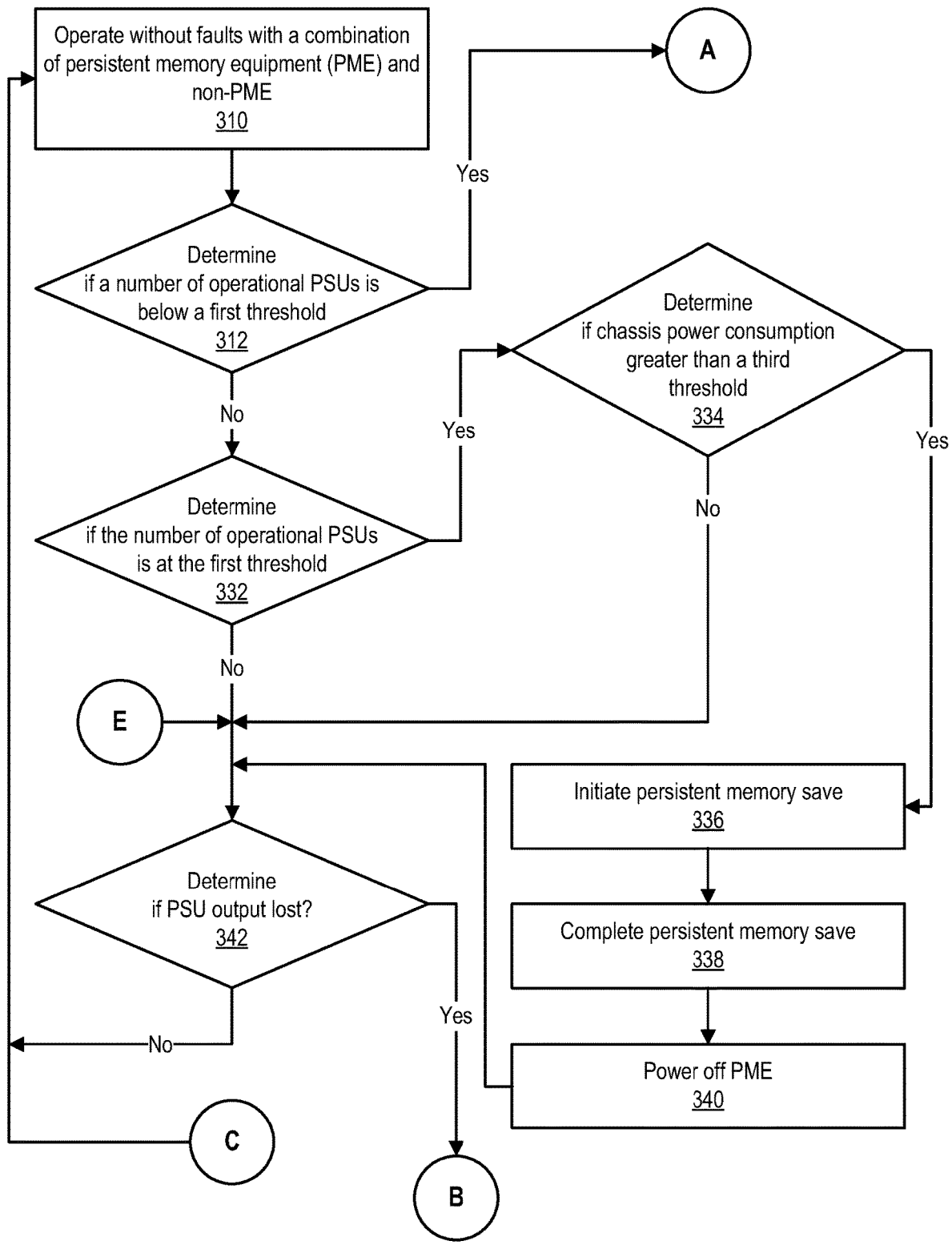
FIGS. 3A-3C illustrate an example of a method of operating information handling systems, according to one or more embodiments.
Figure 3B:
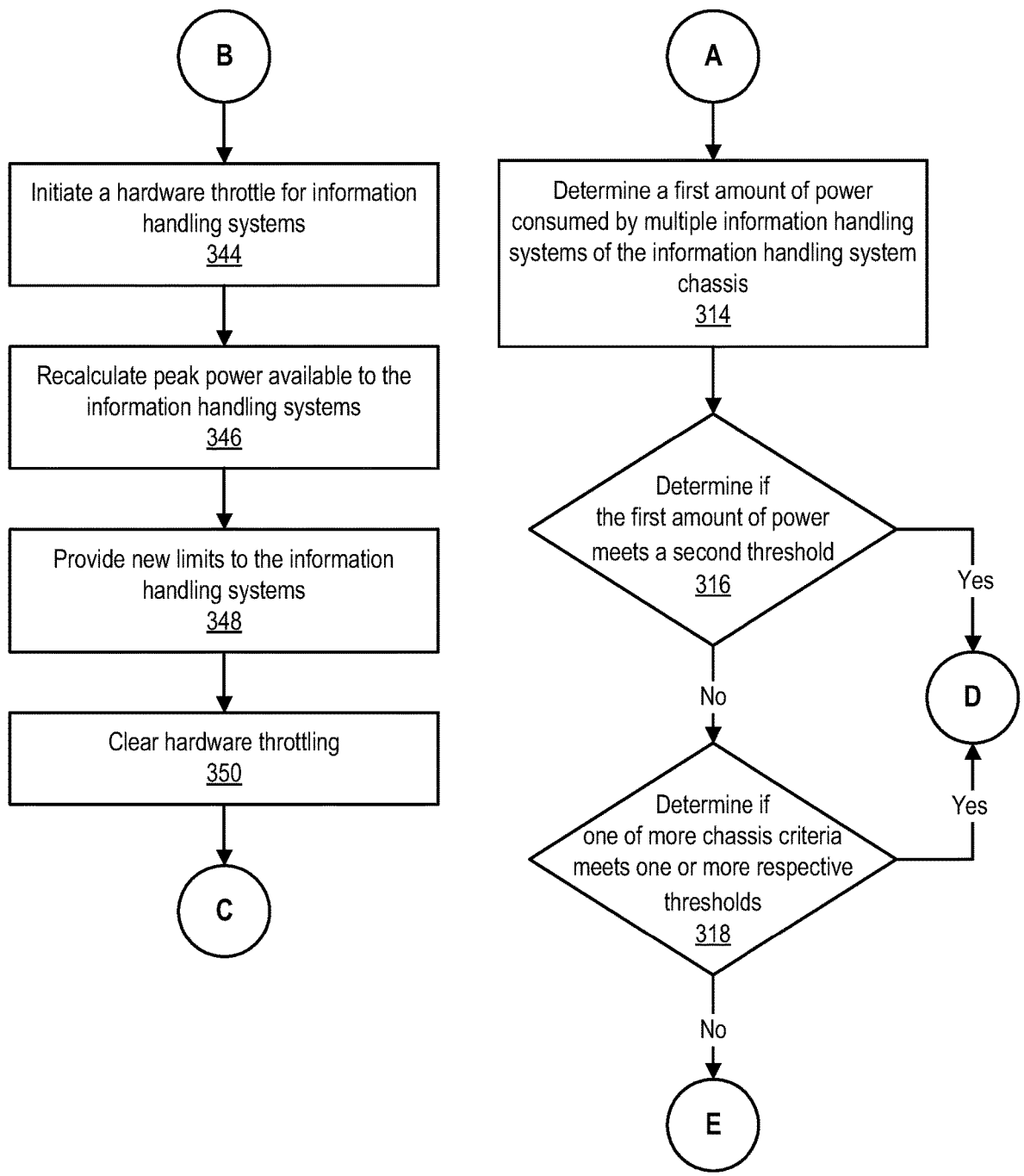
Figure 3C:
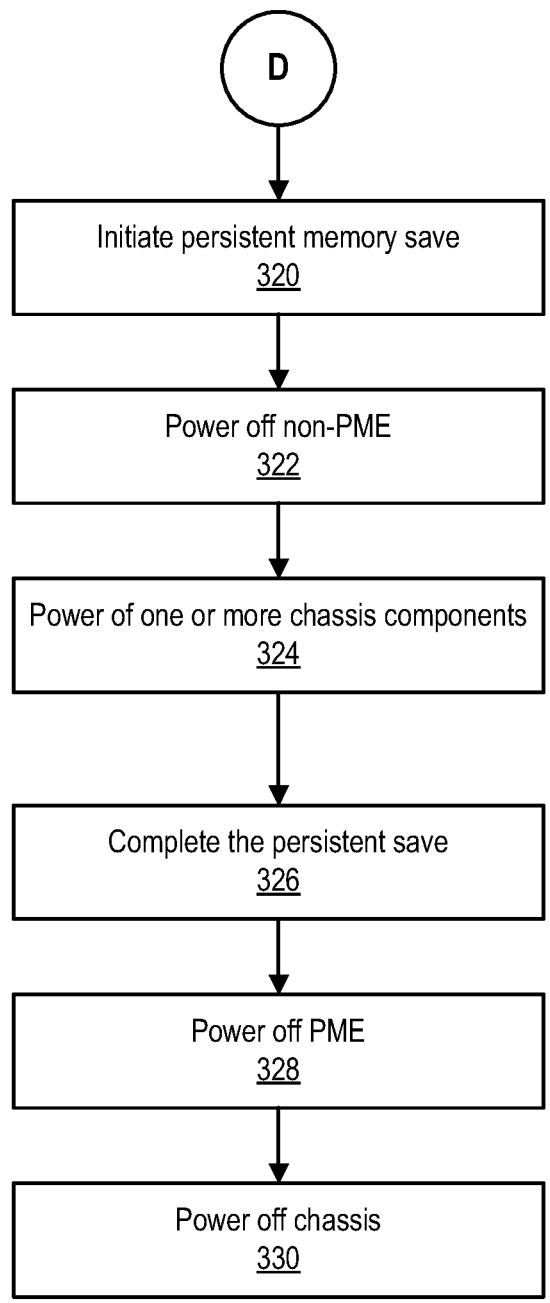

Turning now to FIGS. 3A-3C, an example of a method of operating information handling systems is illustrated, according to one or more embodiments. At 310, a combination of persistent memory equipment (PME) and non-persistent memory equipment (non-PME) may operate without faults. In one example, the PME may include first one or more information handling systems of an information handling system chassis. For instance, the first one or more information handling systems may be or include one or more of IHSs 110A and 110C-110E of information handling system chassis 200. In another example, the non-PME may include second one or more information handling systems of the information handling system chassis. For instance, the second one or more information handling systems may be or include one or more of IHSs 110B, 110F, and 110G of information handling system chassis 200.

At 312, it may be determined if a number of operational PSUs is below a first threshold. In one or more embodiments, the first threshold may be a minimum threshold. For example, determining if a number of operational PSUs is below a first threshold may include determining if a number of operational PSUs is below a minimum threshold of operational PSUs. In one or more embodiments, the first threshold may be configurable. For example, chassis 200 may receive configuration information that indicates the first threshold. In one instance, the configuration information that indicates the first threshold may be received via user input that indicates the first threshold. In another instance, the configuration information that indicates the first threshold may be received via an information handling system and/or a configuration file and/or database that that indicates the first threshold.

At 314, a first amount of power consumed by the multiple information handling systems of the information handling system chassis may be determined. For example, a first amount of power consumed by the first one or more information handling systems and the second one or more information handling systems. For instance, a first amount of power consumed by the PME and the non-PME. In one or more embodiments, determining a first amount of power consumed by the multiple information handling systems of the information handling system chassis may include determining power consumed by one or more other components of the information handling system chassis. For example, the one or more other components of the information handling system chassis (e.g., chassis 200) may include one or more fans, one or more enclosure controllers, and/or one or more non-volatile memory media, among others. For instance, the one or more other components of chassis 200 may include one or more of ECs 210, one or more of fans 230, and/or one or more of non-volatile memory media 250, among others.

At 316, it may be determined if the first amount of power meets a second threshold. In one or more embodiments, determining if the first amount of power meets a second threshold may include determining if the first amount of power is equal to or is greater than a second threshold. In one or more embodiments, the second threshold may be configurable. For example, chassis 200 may receive configuration information that indicates the second threshold. In one instance, the configuration information that indicates the second threshold may be received via user input that indicates the second threshold. In another instance, the configuration information that indicates the second threshold may be received via an information handling system and/or a configuration file and/or database that that indicates the second threshold.

If the first amount of power does not meet the second threshold, it may be determined if one or more chassis criteria meets one or more respective thresholds, at 318. In one or more embodiments, the one or more chassis criteria may include one or more of a minimum number of operational PSUs, a temperature (e.g., a chassis component temperature, an internal chassis temperature, etc.), an infrastructure power consumption, a ratio of power allocations versus capacity of operational PSUs, and a chassis fan pulse width modulation (PWM), among others.

If the first amount of power meets the second threshold or if the one or more chassis criteria meets the third threshold, a persistent memory save may be initiated, at 320. For example, the PME may receive a signal that initiates a persistent memory save. For instance, one or more memory media 150A of the first one or more information handling systems, respectively, may initiate a persistent memory save. In one or more embodiments, initiating a persistent memory save may include initiating a data transfer from a volatile memory medium of memory medium 150A to a non-volatile memory medium of memory medium 150A. For example, initiating a data transfer from a volatile memory medium of memory medium 150A to a non-volatile memory medium of memory medium 150A may include initiating a data transfer from DRAM of memory medium 150A to flash memory of memory medium 150A.

At 322, non-PME may be powered off. For example, the second one or more information handling systems may be powered off. At 324, one or more chassis components may be powered off. In one or more embodiments, the one or more chassis components that may be powered off at 324 may be or include one or more chassis components that may not be essential and/or necessary in continuing to shutdown chassis 200. For example, one or more backup and/or redundant components of chassis 200 may not be essential and/or necessary in continuing to shutdown chassis 200. For instance, one or more backup and/or redundant components of chassis 200 may be powered off.

At 326, the persistent memory save may be completed. For example, the PME may complete the persistent memory save. For instance, one or more memory media 150A of the first one or more information handling systems, respectively, may complete the persistent memory save. In one or more embodiments, completing the persistent memory save may include completing the data transfer from the volatile memory medium of memory medium 150A to the non-volatile memory medium of memory medium 150A. For example, completing the data transfer from the volatile memory medium of memory medium 150A to the non-volatile memory medium of memory medium 150A may include completing the data transfer from DRAM of memory medium 150A to flash memory of memory medium 150A. In one or more embodiments, completing the persistent memory save may include providing information associated with a completion of the persistent memory save. For example, each of the first one or more information handling systems may provide information to EC 210 that indicates that the persistent memory save has been completed. At 328, the PME may be powered off. For example, the first one or more information handling systems may be powered off. At 330, the information handling system chassis may be powered off. For example, chassis 200 may be powered off.

If a number of operational PSUs is not below a first threshold, it may be determined if the number of operational PSUs is at the first threshold, at 332. If the number of operational PSUs is at the first threshold, it may be determined if a chassis power consumption is greater than a third threshold, at 334. In one or more embodiments, the third threshold may be configurable. For example, chassis 200 may receive configuration information that indicates the third threshold. In one instance, the configuration information that indicates the third threshold may be received via user input that indicates the third threshold. In another instance, the configuration information that indicates the third threshold may be received via an information handling system and/or a configuration file and/or database that that indicates the third threshold. In one or more embodiments, the third threshold may be or include a percentage of the chassis power consumption. In one example, determining if the chassis power consumption is greater than the third threshold may include determining if the chassis power consumption is greater than eighty percent (80%) of power that one or more operational PSUs are capable of supplying. In another example, determining if the chassis power consumption is greater than the third threshold may include determining if the chassis power consumption is greater than one hundred and ten percent (110%) of power that one or more operational PSUs are rated as capable of supplying.

If the chassis power consumption is greater than the third threshold, a persistent memory save may be initiated, at 336.

For example, the PME may receive a signal that initiates a persistent memory save. For instance, one or more memory media 150A of the first one or more information handling systems, respectively, may initiate a persistent memory save. In one or more embodiments, initiating a persistent memory save may include initiating a data transfer from a volatile memory medium of memory medium 150A to a non-volatile memory medium of memory medium 150A. For example, initiating a data transfer from a volatile memory medium of memory medium 150A to a non-volatile memory medium of memory medium 150A may include initiating a data transfer from DRAM of memory medium 150A to flash memory of memory medium 150A.

At 338, the persistent memory save may be completed. For example, the PME may complete the persistent memory save. For instance, one or more memory media 150A of the first one or more information handling systems, respectively, may complete the persistent memory save. In one or more embodiments, completing the persistent memory save may include completing the data transfer from the volatile memory medium of memory medium 150A to the non-volatile memory medium of memory medium 150A. For example, completing the data transfer from the volatile memory medium of memory medium 150A to the non-volatile memory medium of memory medium 150A may include completing the data transfer from DRAM of memory medium 150A to flash memory of memory medium 150A. In one or more embodiments, completing the persistent memory save may include providing information associated with a completion of the persistent memory save. For example, each of the first one or more information handling systems may provide information to EC 210 that indicates that the persistent memory save has been completed.

At 340, the PME may be powered off. For example, the first one or more information handling systems may be powered off. If the number of operational PSUs is not at the first threshold, or if the chassis power consumption is not greater than the third threshold, or if one or more chassis criteria does not meet a third threshold, it may be determined if PSU output is lost, at 342. If PSU output is not lost, the method may proceed to 310, according to one or more embodiments.

If PSU output is lost, a hardware throttle for information handling systems may be initiated, at 344. For example, a hardware throttle may be initiated for two or more of IHSs 110A-110G. In one or more embodiments, initiating a hardware throttle for information handling systems may include providing information to the information handling systems. For example, the information may indicate that each of the information handling systems should operate with a lower power consumption (e.g., a lower power consumption than currently operating). For instance, operating at a lower power consumption may include decreasing one or more clock frequencies (e.g., a clock frequency of a processor, a clock frequency of a memory medium, a clock frequency of a bus, etc.), decreasing a number of processors that process information, and/or decreasing a number of memory media that are utilized, among others.

At 346, peak power available to the information handling systems may be recalculated. In one or more embodiments, recalculating the peak power available to the information handling systems may be based at least on the number of operational PSUs. In one or more embodiments, recalculating the peak power available to the information handling systems may be based at least on configuration information. For example, chassis 200 may receive configuration information that indicates peak power information. In one instance, the configuration information may indicate percentage of a total capacity of one or more operational PSUs. In another instance, the configuration information may be received via an information handling system and/or a configuration file and/or database that that indicates the third threshold. In one or more embodiments, the configuration information may include user input.

At 348, new limits may be provided to the information handling systems. In one or more embodiments, the new limits may be based at least on recalculated peak power available to the information handling systems. In one or more embodiments, the new limits may include hardware throttling information. For example, the hardware throttling information may indicate that each of the information handling systems should operate with a lower power consumption (e.g., a lower power consumption than currently operating). For instance, operating at a lower power consumption may include decreasing one or more clock frequencies (e.g., a clock frequency of a processor, a clock frequency of a memory medium, a clock frequency of a bus, etc.), decreasing a number of processors that process information, and/or decreasing a number of memory media that are utilized, among others.

At 350, hardware throttling may be cleared. In one or more embodiments, clearing hardware throttling may include each of the operating information handling systems of chassis 200 indicating that the new limits have been received and/or implemented. For example, each of the operating information handling systems of chassis 200 may provide information, to EC 210, that indicates that the new limits have been received and/or implements, one or more times. In one or more embodiments, the method may proceed to 310.

Figure 4A:
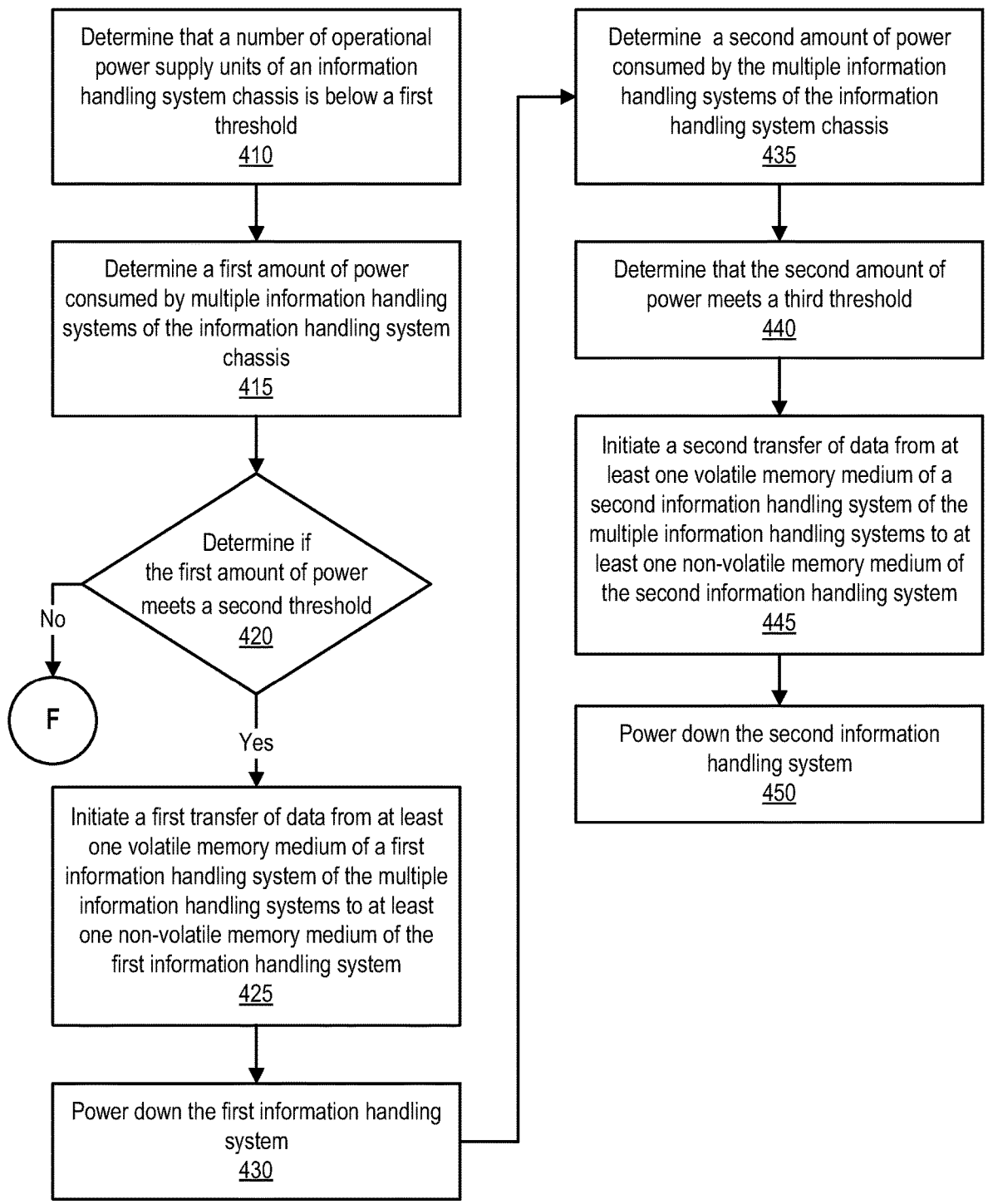
FIGS. 4A and 4B illustrate another example of a method of operating information handling systems, according to one or more embodiments.
Figure 4B:
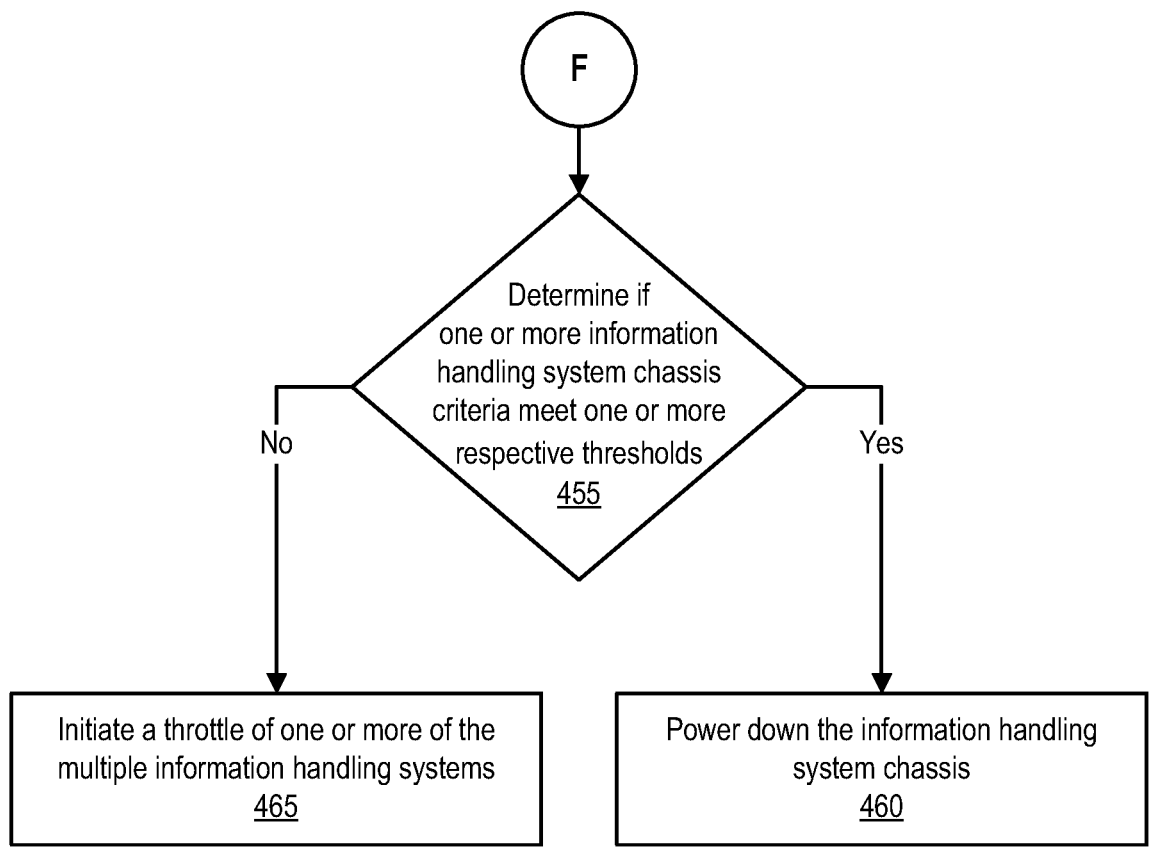

Turning now to FIGS. 4A and 4B, another example of a method of operating information handling systems is illustrated, according to one or more embodiments. At 410, it may be determined that a number of operational power supply units of an information handling system chassis is below a first threshold. For example, EC 210 may determine that a number of PSUs 220 is below a first threshold.

At 415, a first amount of power consumed by multiple information handling systems of the information handling system chassis may be determined. For example, EC 210 may determine may determine a first amount of power consumed by two or more of IHSs 110A-110G. For instance, two of more of IHSs 110A-110G may be consuming power. In one or more embodiments, determining the first amount of power consumed by the multiple information handling systems may include determining power consumed by one or more other components of the information handling system chassis. For example, the one or more other components of the information handling system chassis may include one or more of an EC 210, a fan 230, and a non-volatile memory medium 250, among others.

At 420, it may be determined if the first amount of power meets a second threshold. For example, EC 210 may determine if the first amount of power meets a second threshold. In one or more embodiments, determining if the first amount of power meets a second threshold may include determining if the first amount of power is greater than or equal to a second threshold. In one or more embodiments, the second threshold may be configurable. For example, chassis 200 may receive configuration information that indicates the second threshold. In one instance, the configuration information that indicates the second threshold may be received via user input that indicates the second threshold. In another instance, the configuration information that indicates the second threshold may be received via an information handling system and/or a configuration file and/or database that that indicates the second threshold.

In one or more embodiments, power consumed by the multiple information handling systems of the information handling system chassis may be monitored. In one or more embodiments, monitoring the power consumed by the multiple information handling systems may include determining the first amount of power consumed by the multiple information handling systems of the information handling system chassis and/or determining that the first amount of power meets the second threshold. In one or more embodiments, monitoring the power consumed by the multiple information handling systems may be performed on a periodic basis.

If the first amount of power meets the second threshold, a first transfer of data from at least one volatile memory medium of a first information handling system of the multiple information handling systems to at least one non-volatile memory medium of the first information handling system may be initiated, at 425. For example, EC 210 may initiate a first transfer of data from at least one volatile memory medium of a first information handling system of the multiple information handling systems to at least one non-volatile memory medium of the first information handling system. For instance, initiating a first transfer of data from at least one volatile memory medium of a first information handling system of the multiple information handling systems to at least one non-volatile memory medium of the first information handling system may include providing a signal to the first information handling system that may initiate the first transfer of the data from the at least one volatile memory medium of the first information handling system to the at least one non-volatile memory medium of the first information handling system.

In one or more embodiments, a first non-volatile dual in-line memory module may include the at least one volatile memory medium of the first information handling system and the at least one non-volatile memory medium of the first information handling system. In one or more embodiments, initiating a first transfer of data from at least one volatile memory medium of a first information handling system of the multiple information handling systems to at least one non-volatile memory medium of the first information handling system may include EC 210 providing information to a CPLD 195 of the first information handling system. For example, the information provided to CPLD 195 of the first information handling system may indicate that a first transfer of data from at least one volatile memory medium of a first information handling system of the multiple information handling systems to at least one non-volatile memory medium of the first information handling system should occur.

At 430, the first information handling system may be powered down. For example, EC 210 may power down the first information handling system. In one or more embodiments, the first information handling system may be powered down after the first transfer of the data from the at least one volatile memory medium of the first information handling system to the at least one non-volatile memory medium of the first information handling system is completed.

At 435, a second amount of power consumed by the multiple information handling systems of the information handling system chassis may be determined. For example, EC 210 may determine a second amount of power consumed by the multiple information handling systems of the information handling system chassis. In one or more embodiments, determining a second amount of power consumed by the multiple information handling systems of the information handling system chassis may be performed after the first information handling system is powered down. In one or more embodiments, determining the second amount of power consumed by the multiple information handling systems may include determining power consumed by one or more other components of the information handling system chassis. For example, the one or more other components of the information handling system chassis may include one or more of an EC 210, a fan 230, and a non-volatile memory medium 250, among others.

At 440, it may be determined that the second amount of power meets a third threshold. In one or more embodiments, the third threshold may be configurable. For example, EC 210 may determine that the second amount of power meets a third threshold. In one or more embodiments, chassis 200 may receive configuration information that indicates the third threshold. In one example, the configuration information that indicates the third threshold may be received via user input that indicates the third threshold. In another example, the configuration information that indicates the third threshold may be received via an information handling system and/or a configuration file and/or database that that indicates the third threshold.

At 445, a second transfer of data from at least one volatile memory medium of a second information handling system of the multiple information handling systems to at least one non-volatile memory medium of the second information handling system may be initiated. For example, EC 210 may initiate a second transfer of data from at least one volatile memory medium of a second information handling system of the multiple information handling systems to at least one non-volatile memory medium of the second information handling system. For instance, initiating a second transfer of data from at least one volatile memory medium of a second information handling system of the multiple information handling systems to at least one non-volatile memory medium of the second information handling system may include providing a signal to the second information handling system that may initiate the second transfer of the data from the at least one volatile memory medium of the second information handling system to the at least one non-volatile memory medium of the second information handling system.

In one or more embodiments, a second non-volatile dual in-line memory module of the second information handling system may include the at least one volatile memory medium of the second information handling system and the at least one non-volatile memory medium of the second information handling system. In one or more embodiments, initiating a second transfer of data from at least one volatile memory medium of a second information handling system of the multiple information handling systems to at least one non-volatile memory medium of the second information handling system may include EC 210 providing information to a CPLD 195 of the second information handling system. For example, the information provided to CPLD 195 of the second information handling system may indicate that a second transfer of data from at least one volatile memory medium of a second information handling system of the multiple information handling systems to at least one non-volatile memory medium of the second information handling system should occur.

At 450, the second information handling system may be powered down. For example, EC 210 may power down the second information handling system. In one or more embodiments, the second information handling system may be powered down after the second transfer of the data from the at least one volatile memory medium of the second information handling system to the at least one non-volatile memory medium of the second information handling system is completed.

In one or more embodiments, power consumed by the multiple information handling systems of the information handling system chassis may be monitored after the second information handling system is powered down. In one or more embodiments, monitoring the power consumed by the multiple information handling systems may include determining the second amount of power consumed by the multiple information handling systems of the information handling system chassis and/or determining that the second amount of power meets the third threshold. In one or more embodiments, monitoring the power consumed by the multiple information handling systems may be performed on a periodic basis.

If the first amount of power does not meet the second threshold, it may be determined if one or more information handling system chassis criteria meet one or more respective thresholds, at 455. For example, EC 210 may determine if one or more information handling system chassis criteria meet one or more respective thresholds. In one or more embodiments, the one or more chassis criteria may include one or more of a minimum number of operational PSUs, an infrastructure power consumption, a ratio of power allocations versus capacity of operational PSUs, and a chassis fan PWM, among others. If the one or more chassis criteria meet the one or more respective thresholds, the information handling system chassis may be powered off, at 460. For example, EC 210 may power off the information handling system chassis.

If the one or more chassis criteria does not meet the one or more respective thresholds, a throttle of one or more of the multiple information handling systems may be initiated, at 465. For example, EC 210 may initiate a throttle of one or more of the multiple information handling systems. In one or more embodiments, initiating a throttle of one or more of the multiple information handling systems may include providing information to the information handling systems. For example, the information may indicate that each of the multiple information handling systems should operate with a lower power consumption (e.g., a lower power consumption than currently operating). For instance, operating at a lower power consumption may include decreasing one or more clock frequencies (e.g., a clock frequency of a processor, a clock frequency of a memory medium, a clock frequency of a bus, etc.), decreasing a number of processors that process information, and/or decreasing a number of memory media that are utilized, among others.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a chassis configured to house a plurality of information handling systems;
   a plurality of power supply units housed in the chassis;
   an enclosure controller that is coupled to the plurality of information handling systems and that is configured to:
      determine that a number of operational power supply units of the plurality of power supply units is below a first threshold;
      determine a first amount of power consumed by the plurality of information handling systems;
      determine if the first amount of power is greater than or equal to a second threshold;
      if the first amount of power is greater than or equal to the second threshold:
         initiate a first transfer of data from at least one volatile memory medium of a first information handling system of the plurality of information handling systems to at least one non-volatile memory medium of the first information handling system;
         power down the first information handling system;
         after the first information handling system is powered down, determine a second amount of power consumed by the plurality of information handling systems;
         determine that the second amount of power meets a third threshold; and
         initiate a second transfer of data from at least one volatile memory medium of a second information handling system of the plurality of information handling systems to at least one non-volatile memory medium of the second information handling system;
      if the first amount of power does not meet the second threshold, determine if one or more chassis criteria meet one or more respective thresholds;
      if the one or more chassis criteria meet the one or more respective thresholds, power off the chassis; and
      if the one or more chassis criteria does not meet the one or more respective thresholds, initiate a throttle of one or more of the plurality of information handling systems.

2. The system of claim 1,
   wherein a first non-volatile dual in-line memory module of the first information handling system includes the at least one volatile memory medium of the first information handling system and the at least one non-volatile memory medium of the first information handling system; and
   wherein a second non-volatile dual in-line memory module of the second information handling system includes the at least one volatile memory medium of the second information handling system and the at least one non-volatile memory medium of the second information handling system.

3. The system of claim 2, wherein the first information handling system includes a battery power supply that is configured to provide power to the first non-volatile dual in-line memory module of the first information handling system.

4. The system of claim 1, wherein the one or more chassis criteria include one or more of an infrastructure power consumption, a temperature, a ratio of power allocations versus capacity of operational power supply units, and a chassis fan pulse width modulation.

5. The system of claim 1, wherein the enclosure controller is further configured to:
receive configuration information that indicates the second threshold.

6. The system of claim 1, wherein the enclosure controller is further configured to:
after the first information handling system is powered down, periodically monitor power consumed by the plurality of information handling systems;
wherein, when the enclosure controller periodically monitors the power consumed by the plurality of information handling systems, the enclosure controller:
determines the second amount of power consumed by the plurality of information handling systems; and
determines that the second amount of power meets the third threshold.

7. The system of claim 6, further comprising:
at least one other component of the chassis;
wherein, to determine the first amount of power consumed by the plurality of information handling systems, the enclosure controller is further configured to determine power consumed by the at least one other component of the chassis.

8. A method, comprising:
determining that a number of operational power supply units, of a plurality of power supply units of an information handling system chassis, is below a first threshold;
determining a first amount of power consumed by a plurality of information handling systems housed by the information handling system chassis;
determining if the first amount of power is greater than or equal to a second threshold;
if the first amount of power is greater than or equal to meets the second threshold:
initiating a first transfer of data from at least one volatile memory medium of a first information handling system of the plurality of information handling systems to at least one non-volatile memory medium of the first information handling system;
powering down the first information handling system;
after the first information handling system is powered down, determining a second amount of power consumed by the plurality of information handling systems of the information handling system chassis;
determining that the second amount of power meets a third threshold; and
initiating a second transfer of data from at least one volatile memory medium of a second information handling system of the plurality of information handling systems to at least one non-volatile memory medium of the second information handling system;

if the first amount of power does not meet the second threshold, determining if one or more chassis criteria meet one or more respective thresholds;
if the one or more chassis criteria meet the one or more respective thresholds, powering off the information handling system chassis; and
if the one or more chassis criteria does not meet the one or more respective thresholds, initiating a throttle of one or more of the plurality of information handling systems.

9. The method of claim 8,
wherein a first non-volatile dual in-line memory module of the first information handling system includes the at least one volatile memory medium of the first information handling system and the at least one non-volatile memory medium of the first information handling system; and
wherein a second non-volatile dual in-line memory module of the second information handling system includes the at least one volatile memory medium of the second information handling system and the at least one non-volatile memory medium of the second information handling system.

10. The method of claim 9, wherein the first information handling system includes a battery power supply that is configured to provide power to the first non-volatile dual in-line memory module of the first information handling system.

11. The method of claim 8, wherein the one or more chassis criteria include one or more of an infrastructure power consumption, a temperature, a ratio of power allocations versus capacity of operational power supply units, and a chassis fan pulse width modulation.

12. The method of claim 8, further comprising:
receiving configuration information that indicates the second threshold.

13. The method of claim 8, further comprising:
after the first information handling system is powered down, periodically monitoring power consumed by the plurality of information handling systems of the information handling system chassis;
wherein the periodically monitoring includes:
the determining the second amount of power consumed by the plurality of information handling systems of the information handling system chassis; and
the determining that the second amount of power meets the third threshold.

14. The method of claim 13, wherein the determining the first amount of power consumed by the plurality of information handling systems of the information handling system chassis includes determining power consumed by at least one other component of the chassis.

15. A computer-readable non-transitory memory medium that includes processor instructions that, when executed by at least one processor of an enclosure controller, cause the enclosure controller to:
determine that a number of operational power supply units of a plurality of power supply units is below a first threshold;
determine a first amount of power consumed by a plurality of information handling systems housed by an information handling system chassis;
determine if the first amount of power is greater than or equal to a second threshold;
if the first amount of power is greater than or equal to the second threshold:

initiate a first transfer of data from at least one volatile memory medium of a first information handling system of the plurality of information handling systems to at least one non-volatile memory medium of the first information handling system;

power down the first information handling system;

after the first information handling system is powered down, determine a second amount of power consumed by the plurality of information handling systems;

determine that the second amount of power meets a third threshold; and initiate a second transfer of data from at least one volatile memory medium of a second information handling system of the plurality of information handling systems to at least one non-volatile memory medium of the second information handling system;

if the first amount of power does not meet the second threshold, determine if one or more chassis criteria meet one or more respective thresholds;

if the one or more chassis criteria meet the one or more respective thresholds, power off the information handling system chassis; and if the one or more chassis criteria does not meet the one or more respective thresholds, initiate a throttle of one or more of the plurality of information handling systems.

16. The computer-readable non-transitory memory medium of claim 15, wherein a first non-volatile dual in-line memory module of the first information handling system includes the at least one volatile memory medium of the first information handling system and the at least one non-volatile memory medium of the first information handling system; and wherein a second non-volatile dual in-line memory module of the second information handling system includes the at least one volatile memory medium of the second information handling system and the at least one non-volatile memory medium of the second information handling system.

17. The computer-readable non-transitory memory medium of claim 15, wherein the one or more chassis criteria include one or more of an infrastructure power consumption, a temperature, a ratio of power allocations versus capacity of operational power supply units, and a chassis fan pulse width modulation.

18. The computer-readable non-transitory memory medium of claim 15, wherein the instructions further cause the enclosure controller to:

receive configuration information that indicates the second threshold.

19. The computer-readable non-transitory memory medium of claim 15, wherein the processor instructions further cause enclosure controller to:

after the first information handling system is powered down, periodically monitor power consumed by the plurality of information handling systems;

wherein, when the enclosure controller periodically monitors the power consumed by the plurality of information handling systems, the enclosure controller:

determines the second amount of power consumed by the plurality of information handling systems; and determines that the second amount of power meets the third threshold.

20. The computer-readable non-transitory memory medium of claim 19, wherein, to determine the first amount of power consumed by the plurality of information handling systems, the processor instructions further cause the enclosure controller to determine power consumed by at least one other component of the chassis.

* * * * *